United States Patent
Cheng et al.

(10) Patent No.: US 12,542,423 B2
(45) Date of Patent: Feb. 3, 2026

(54) SEMICONDUCTOR LASER, OPTICAL TRANSMITTER COMPONENT, OPTICAL LINE TERMINAL, AND OPTICAL NETWORK UNIT

(71) Applicant: HUAWEI TECHNOLOGIES CO., LTD., Shenzhen (CN)

(72) Inventors: Yuanbing Cheng, Wuhan (CN); Jing Dai, Shenzhen (CN); Yinghua Dong, Shenzhen (CN); Sulin Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 858 days.

(21) Appl. No.: 17/333,289

(22) Filed: May 28, 2021

(65) Prior Publication Data

US 2021/0296859 A1   Sep. 23, 2021

Related U.S. Application Data

(63) Continuation of application No. PCT/CN2019/070483, filed on Jan. 4, 2019.

(51) Int. Cl.
   *H04J 14/02* (2006.01)
   *H01S 5/12* (2021.01)
   *H01S 5/34* (2006.01)

(52) U.S. Cl.
   CPC .............. *H01S 5/1237* (2013.01); *H01S 5/12* (2013.01); *H01S 5/34* (2013.01); *H04J 14/0246* (2013.01)

(58) Field of Classification Search
   CPC ...... H01S 5/026; H01S 5/0265; H01S 5/0625; H01S 5/06256; H01S 5/06258; H01S 5/12-125

See application file for complete search history.

(56) References Cited

U.S. PATENT DOCUMENTS

| 4,873,691 A | 10/1989 | Uomi et al. |
| 5,155,736 A | 10/1992 | Ono et al. |
| 5,164,955 A * | 11/1992 | Meyers .................. H01S 5/187 372/96 |
| 5,901,164 A * | 5/1999 | Flanigan ............... H01S 5/0625 372/96 |
| 6,122,299 A | 9/2000 | DeMars et al. |

(Continued)

FOREIGN PATENT DOCUMENTS

| CN | 101227061 A | 7/2008 |
| CN | 102544265 A | 7/2012 |

(Continued)

*Primary Examiner* — Minsun O Harvey
*Assistant Examiner* — Fernanda Adriana Camacho Alanis
(74) *Attorney, Agent, or Firm* — Maier & Maier, PLLC

(57) ABSTRACT

A semiconductor laser, an optical transmitter component, an optical line terminal, and an optical network unit. The semiconductor laser includes a substrate, a lower waveguide layer, a lower confining layer, a central layer, an upper confining layer, a grating layer, an upper waveguide layer, and an electrode layer that are sequentially formed on the substrate. The upper confining layer, the central layer, and the lower confining layer in a filtering region form a core layer of the filtering region. The grating layer in the filtering region includes a slanted grating. Thus, a modulation chirp and dispersion of a transmitted optical pulse can be reduced.

19 Claims, 4 Drawing Sheets

(56) References Cited

U.S. PATENT DOCUMENTS

| | | | |
|---|---|---|---|
| 6,806,114 B1* | 10/2004 | Lo | H01S 5/18361 |
| | | | 438/36 |
| 8,705,583 B2* | 4/2014 | Matsuda | H01S 5/06258 |
| | | | 372/50.11 |
| 8,718,111 B1 | 5/2014 | Zhu et al. | |
| 9,372,306 B1* | 6/2016 | Nagarajan | H01S 5/02415 |
| 10,063,032 B2* | 8/2018 | Matsui | H01S 5/06258 |
| 11,018,475 B2* | 5/2021 | Kim | H01S 5/0425 |
| 11,522,338 B2* | 12/2022 | Lyu | G01B 11/25 |
| 2002/0027938 A1* | 3/2002 | Huang | H01S 5/124 |
| | | | 372/96 |
| 2003/0091086 A1* | 5/2003 | Sahara | H01S 5/06258 |
| | | | 372/50.11 |
| 2004/0258119 A1* | 12/2004 | Shams-Zadeh-Amiri | |
| | | | H01S 5/187 |
| | | | 372/45.01 |
| 2005/0018727 A1* | 1/2005 | Yoshida | H01S 3/302 |
| | | | 372/50.11 |
| 2007/0127534 A1* | 6/2007 | Shimamura | H01S 5/0265 |
| | | | 372/46.015 |
| 2011/0293279 A1* | 12/2011 | Lam | H04J 14/0305 |
| | | | 398/79 |
| 2013/0308178 A1 | 11/2013 | Matsui | |
| 2013/0308662 A1 | 11/2013 | Frisken | |
| 2015/0092800 A1* | 4/2015 | Zucker | H01S 5/02453 |
| | | | 372/29.015 |
| 2016/0204577 A1* | 7/2016 | Zhou | H04B 10/5563 |
| | | | 398/168 |
| 2017/0256912 A1 | 9/2017 | Matsui | |

FOREIGN PATENT DOCUMENTS

| | | | |
|---|---|---|---|
| CN | 102742099 A | | 10/2012 |
| CN | 103986063 A | | 8/2014 |
| CN | 104917052 A | | 9/2015 |
| CN | 107346859 A | * | 11/2017 |
| CN | 108233177 A | | 6/2018 |
| CN | 108649426 A | * | 10/2018 |
| JP | H01273377 A | | 11/1989 |
| JP | H0677571 A | | 3/1994 |
| JP | H08162711 A | | 6/1996 |
| JP | H09186408 A | | 7/1997 |
| JP | 2000124543 A | | 4/2000 |
| JP | 2001237494 A | | 8/2001 |
| JP | 2011158907 A | | 8/2011 |
| JP | 2014116352 A | | 6/2014 |
| KR | 100519922 B1 | | 10/2005 |
| KR | 20080035217 A | | 4/2008 |
| WO | 2004088802 A1 | | 10/2004 |

* cited by examiner

SEMICONDUCTOR LASER, OPTICAL TRANSMITTER COMPONENT, OPTICAL LINE TERMINAL, AND OPTICAL NETWORK UNIT

CROSS-REFERENCE TO RELATED APPLICATIONS

This application is a continuation of International Application No. PCT/CN2019/070483, filed on Jan. 4, 2019, the disclosure of which is hereby incorporated by reference in its entirety.

TECHNICAL FIELD

The embodiments relate to optical communications technologies, and in particular, to a semiconductor laser, an optical transmitter component, an optical line terminal (OLT), and an optical network unit (ONU).

BACKGROUND

With development of internet technologies and continuous development of high-bandwidth services such as 4K/8K high definition, home cloud, and a video call, a user has an increasing bandwidth requirement. To meet the bandwidth requirement of the user, a passive optical network (PON) system gradually replaces copper-wire broadband access and becomes a mainstream technology of an access network. The PON system may usually include an OLT located in a central office (CO), an ONU located at a user end, and an optical distribution network (ODN) connected between the OLT and the ONU.

Currently, an Ethernet passive optical network (EPON) and a gigabit-capable passive optical network (GPON) have been deployed and popularized on a large scale. With the formulation of higher-rate PON network standards, a 10G PON that can be smoothly evolved from the EPON or the GPON is gradually becoming popular. Signal sources in the high-rate PON system mainly include a direct modulated laser (DML) and an electro-absorption modulated semiconductor laser. Output optical power of the DML may be modulated by changing an injected modulation current. The DML is simple in structure, easy to implement, and cost-effective, and is an ideal light source for the PON system. However, current modulation causes a change of an effective refractive index of a waveguide of the laser, and consequently a phase of light is modulated. In this case, an operating frequency of the laser is broadened, that is, there is a relatively large frequency chirp. With an increase of a modulation rate, the chirp phenomenon becomes increasingly serious, dispersion of a transmitted optical pulse is high. Consequently, a signal transmission distance is limited.

While a signal transmission effect and a signal transmission distance in the high-rate PON are ensured, it is particularly important to reduce the chirp of the DML to make the DML meet a requirement of an optical fiber transmission distance at a relatively low dispersion penalty.

SUMMARY

Embodiments provide a semiconductor laser, an optical transmitter component, an optical line terminal, and an optical network unit, to reduce a modulation chirp in a PON system, reduce dispersion of a transmitted optical pulse, and increase a transmission distance of an optical signal.

An embodiment provides a semiconductor laser, including a substrate and a layer body. The layer body includes a lower waveguide layer, a lower confining layer, a central layer, an upper confining layer, a grating layer, an upper waveguide layer, and a first electrode layer that are sequentially formed on the substrate in a preset direction. The preset direction is a direction from an end close to the substrate to an end away from the substrate. The layer body is divided into a laser region, a first isolation region, and a filtering region in a cavity length direction. The first isolation region is located between the laser region and the filtering region, and the first isolation region includes a groove formed by etching the first electrode layer in a vertical direction.

The first electrode layer in the laser region is configured to receive a first electrical excitation signal. The upper confining layer, the central layer, and the lower confining layer in the laser region form an active layer of the laser region, to generate and transmit an optical signal under an action of the first electrical excitation signal. The upper confining layer, the central layer, and the lower confining layer in the filtering region form a core layer of the filtering region, to transmit a filtered optical signal.

The grating layer in the laser region includes a Bragg grating, and the Bragg grating is configured to select a single longitudinal mode. The grating layer in the filtering region includes a slanted grating, and the slanted grating is configured to perform optical filtering.

In an implementation, a material structure of each laminated layer in the laser region is the same as a material structure of a corresponding laminated layer in the filtering region.

In the semiconductor laser in this embodiment, the material structure of each laminated layer in the laser region is the same as the material structure of the corresponding laminated layer in the filtering region, to reduce manufacturing process difficulty of the semiconductor laser.

The Bragg grating is a phase-shifted grating with a wavelength of $\lambda/4$, where $\lambda$ is a lasing wavelength of the laser region.

A length of the Bragg grating in the cavity length direction is any length from 100 micrometers to 400 micrometers.

In another implementation, the Bragg grating is any one of the following: a uniform refractive index-coupled grating, a gain-coupled grating, and a complex coupled grating.

The gain-coupled grating is a grating including a periodically changing gain or loss medium. The complex coupled grating is a grating including the refractive index-coupled grating and the gain-coupled grating.

The slanted grating is a uniform grating with a preset slant angle, and a slant direction of the slanted grating is perpendicular to a waveguide direction or opposite to a waveguide direction.

The preset slant angle is any angle from 2° to 10°.

In this embodiment, any angle from 2° to 10° is selected as the slant angle of the slanted grating, to reduce impact of reflected light of the slanted grating on the laser region.

The Bragg grating satisfies the following formula (1):

$$2N_{eff1}\Lambda_1 = \lambda_1 \quad \text{(formula (1))},$$ where $N_{eff1}$ is an effective waveguide refractive index of the laser region, $\Lambda_1$ is a grating length of the Bragg gating in a single period, and $\lambda_1$ is a Bragg wavelength of the Bragg grating.

The slanted grating satisfies the following formula (2):

$$2N_{eff2}\Lambda_2 = \lambda_2 \quad \text{(formula (2))},$$ where $N_{\mathit{eff2}}$ is an effective waveguide refractive index of the filtering region, $\Lambda_2$ is a grating length of the slanted grating in a single period, and $\lambda_2$ is a filtering wavelength of the slanted grating.

In still another possible implementation, if the Bragg grating is the phase-shifted grating with the wavelength of $\lambda/4$, where $\lambda$ is the lasing wavelength of the laser region, and $\lambda_2$ is equal to $\lambda_1$.

In this embodiment, the phase-shifted grating with the wavelength of $\lambda/4$ is used as the Bragg grating, so that a single-mode yield of the semiconductor laser can be achieved, and wavelength control on an optical signal output by the semiconductor laser can be simplified.

A length of the slanted grating in the cavity length direction is 150 nanometers.

In the semiconductor laser, a laser region-side end face is plated with a highly reflective (HR) film. In the semiconductor laser, a filtering region-side end face is plated with an antireflective (AR) film.

In this embodiment, in the semiconductor laser, the laser region-side end face is further plated with the HR film, and the filtering region-side end face is further plated with the AR film. In this way, light output efficiency of the semiconductor laser can be effectively improved.

In this embodiment, a central value of the lasing wavelength of the laser region falls within a range obtained by increasing or decreasing a frequency corresponding to a central value of the filtering wavelength of the filtering region by 50 GHz.

A contact layer is further formed between the first electrode layer and the upper waveguide layer. The groove is formed by fully etching the first electrode layer and the contact layer and partially or fully etching the upper waveguide layer. An isolation resistance between the laser region and the filtering region is greater than 1000 ohms. In the layer body, a part corresponding to the filtering region further includes a contact layer and a second electrode layer that are sequentially formed on the upper waveguide layer in the preset direction, to amplify and filter an optical signal based on a received second electrical excitation signal.

In the semiconductor laser provided in this embodiment, a photocurrent may be injected into the contact layer in the filtering region, so that carrier density of the filtering region is greater than transparent carrier density. The photocurrent is continuously injected into the contact layer in the filtering region, to make a light output gain. In this way, the light output efficiency of the semiconductor laser is improved while filtering is performed.

In another example, the active layer of the laser region is different from the core layer of the filtering region, and a photoluminescence wavelength of the core layer of the filtering region is at least 100 nm shorter than a photoluminescence wavelength of the active layer of the laser region.

In the layer body, a part corresponding to the filtering region further includes a contact layer that is formed on the upper waveguide layer in the preset direction, but does not include the second electrode layer, to filter an optical signal.

Optionally, the central layer is a core layer, a multiple quantum well layer, a quantum wire layer, or a quantum dot layer that is made of a semiconductor material.

In still another possible implementation, the laser region is sequentially divided into a rear reflection region, a gain region, a phase region, and a front reflection region in the cavity length direction. There is a second isolation region between two adjacent regions, and the second isolation region is formed by fully etching the first electrode layer and partially or fully etching the upper waveguide layer. An isolation resistance between the adjacent regions is greater than 1000 ohms.

In the laser region, the grating layer perpendicular to the rear reflection region and the front reflection region includes the Bragg grating, and the laser region includes at least one of the rear reflection region and the front reflection region.

Photoluminescence wavelengths of active layers of the phase region and the reflection region are at least 100 nm shorter than a photoluminescence wavelength of an active layer of the gain region. The reflection region is the front reflection region or the rear reflection region.

An embodiment may further provide an optical transmitter component, including any one of the foregoing semiconductor lasers.

An embodiment may further provide an optical line terminal (OLT), including an optical transmitter component. The optical transmitter component includes any one of the foregoing semiconductor lasers.

An embodiment may further provide an optical network unit (ONU), including an optical transmitter component. The optical transmitter component includes any one of the foregoing semiconductor lasers.

The embodiments provide the semiconductor laser, the optical transmitter component, the optical line terminal, and the optical network unit. The semiconductor laser includes the substrate and the layer body. The layer body includes the lower waveguide layer, the lower confining layer, the central layer, the upper confining layer, the grating layer, the upper waveguide layer, and the first electrode layer that are sequentially formed on the substrate in the preset direction. The preset direction is the direction from the end close to the substrate to the end away from the substrate. The layer body is divided into the laser region, the first isolation region, and the filtering region in the cavity length direction. The first isolation region is located between the laser region and the filtering region, and the first isolation region includes the groove formed by etching the first electrode layer. The first electrode layer in the laser region is configured to receive the first electrical excitation signal. The upper confining layer, the central layer, and the lower confining layer in the laser region form the active layer of the laser region, to generate and transmit an optical signal under the action of the first electrical excitation signal. The upper confining layer, the central layer, and the lower confining layer in the filtering region form the core layer of the filtering region, to transmit a filtered optical signal. The grating layer in the laser region includes the Bragg grating. The grating layer in the filtering region includes the slanted grating. The Bragg grating is configured to select the single longitudinal mode, and the slanted grating is configured to perform optical filtering. In the semiconductor laser provided in the embodiments, the single longitudinal mode may be selected by using the Bragg grating included in the grating layer in the laser region, and optical filtering may be performed by using the slanted grating included in the grating layer in the filtering region. In this way, a modulation chirp of the semiconductor laser is reduced, an extinction ratio is increased, dispersion of an optical pulse is reduced, and a transmission distance of an optical signal is increased, and therefore a requirement of an optical fiber transmission distance is met at a relatively low dispersion penalty.

DETAILED DESCRIPTION OF THE EMBODIMENTS

Figure 1:
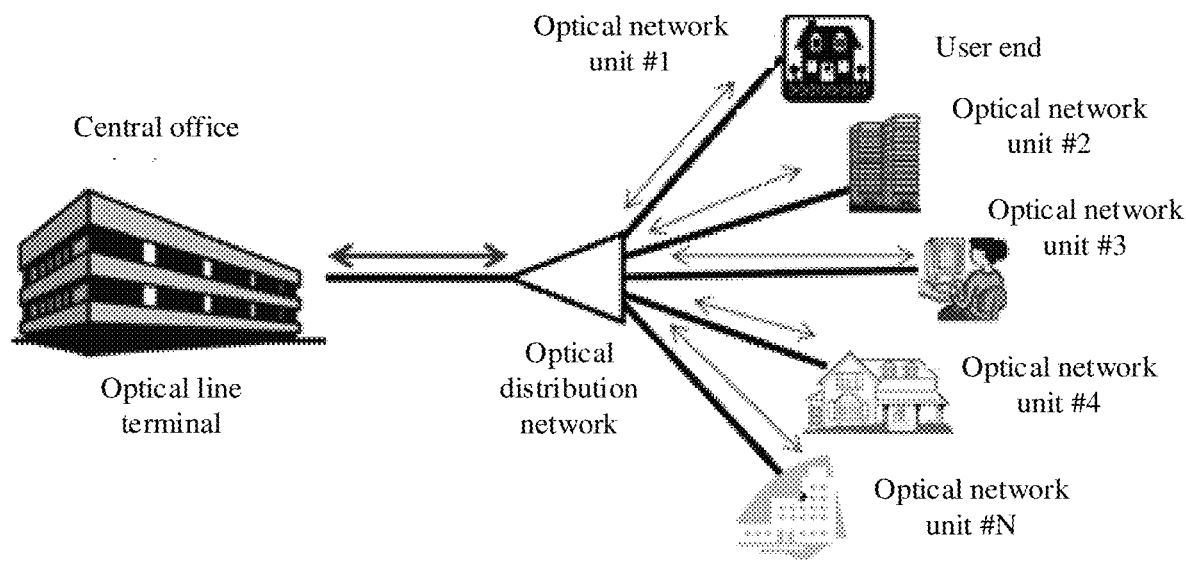
FIG. 1 is a schematic diagram of a PON system according to an embodiment.

A semiconductor laser, an optical transmitter component, an OLT, an ONU, and the like provided in the embodiments may be applied to a PON system. The following describes an example of a PON system in the embodiments with reference to the accompanying drawings. FIG. 1 is a schematic diagram of a PON system according to an embodiment. As shown in FIG. 1, the PON system includes an OLT located in a central office and N ONUs located at a user end. The N ONUs may be an ONU #1 to an ONU #N shown in FIG. 1. The OLT may be connected to the N ONUs by using an ODN. The ODN is responsible for optical signal transmission between the OLT and the ONU. In the PON system, each of a signal source of the OLT located in the central office and a signal source of each ONU located at the user end may be modulated by using a DML, to output a to-be-transmitted optical signal.

The semiconductor laser provided in the embodiments may be applied to the OLT in FIG. 1, or may be applied to the ONU in FIG. 1, to reduce a modulation chirp of an optical signal and reduce dispersion of a transmitted optical pulse to ensure a transmission distance of the optical signal.

Figure 2:
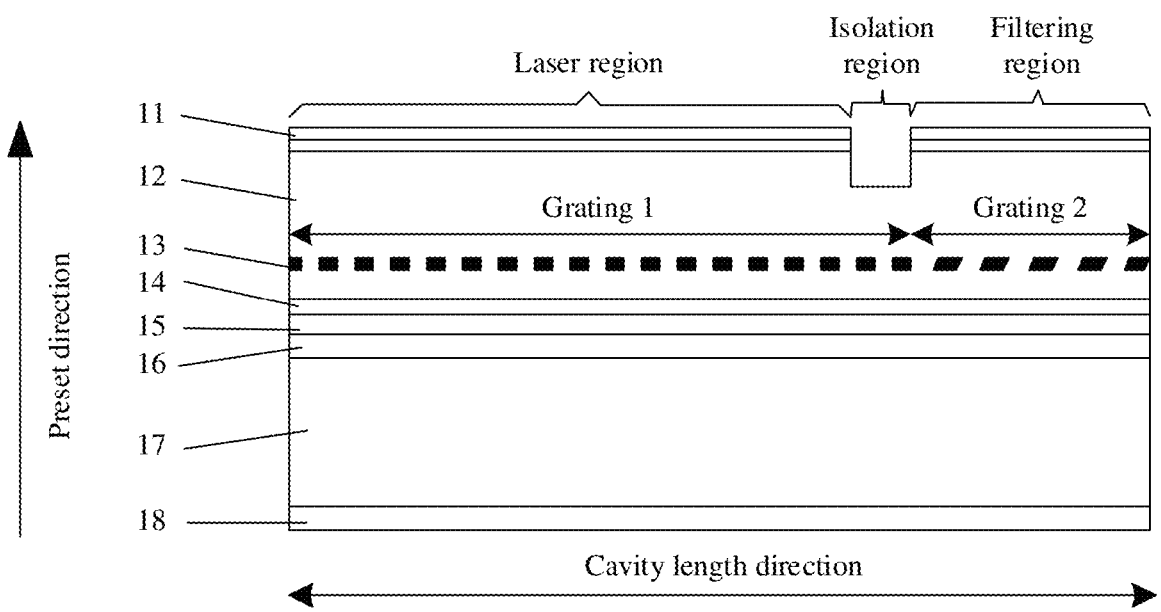
FIG. 2 is a first cross-sectional schematic view of a semiconductor laser in a cavity length direction according to an embodiment.

The following describes, with reference to a plurality of examples, the semiconductor laser provided in the embodiments. FIG. 2 is a cross-sectional schematic view 1 of a semiconductor laser in a cavity length direction according to an embodiment. As shown in FIG. 2, the semiconductor laser includes a substrate 18 and a layer body. The layer body includes a lower waveguide layer 17, a lower confining layer 16, a central layer 15, an upper confining layer 14, a grating layer 13, an upper waveguide layer 12, and a first electrode layer 11 that are sequentially formed on the substrate in a preset direction. The preset direction is a direction from an end close to the substrate 18 to an end away from the substrate 18. The layer body is divided into a laser region, an isolation region, and a filtering region in the cavity length direction. The isolation region is located between the laser region and the filtering region. The isolation region between the laser region and the filtering region may be referred to as a first isolation region, and the isolation region may include a groove formed by etching the first electrode layer 11. The groove may be a groove formed by etching the first electrode layer 11 in an opposite direction of the preset direction.

The laser region, the isolation region, and the filtering region are located on the substrate 18. The laser region is configured to: generate and transmit an optical signal. The filtering region may also be referred to as a filter region, and is configured to filter an optical signal.

The first electrode layer 11 in the laser region is configured to receive a first electrical excitation signal. The upper confining layer 14, the central layer 15, and the lower confining layer 16 in the laser region form an active layer of the laser region, to generate and transmit an optical signal under an action of the first electrical excitation signal. The upper confining layer 14, the central layer 15, and the lower confining layer 16 in the filtering region form a core layer of the filtering region, to transmit a filtered optical signal.

The grating layer 13 in the laser region includes a Bragg grating. Optionally, the grating layer 13 in the isolation region may also include a Bragg grating. The Bragg grating in the laser region and the Bragg grating in the isolation region may form a grating 1 shown in FIG. 1. The grating layer 13 in the filtering region includes a slanted grating, for example, a grating 2 shown in FIG. 1.

The Bragg grating is configured to select a single longitudinal mode, and the slanted grating is configured to perform optical filtering.

For example, the laser region may be a distributed feedback laser (DFB) region or a distributed Bragg reflector (DBR) region. If the laser region is a DFB region, the first electrical excitation signal may be loaded to the first electrode layer 11 in the laser region by using a bias-tee. The first electrical excitation signal is also referred to as a direct modulation signal. For the semiconductor laser provided in this embodiment, magnitudes of a transient chirp and an adiabatic chirp of the semiconductor laser may be controlled by controlling intensity of a bias current and a modulation current of the first electrical excitation signal, namely, the modulation signal.

The Bragg grating included in the grating layer 13 in the laser region is configured to: select a single longitudinal-mode optical signal, and transmit the selected single longitudinal-mode optical signal by using the active layer of the laser region.

The slanted grating may form a slanted grating filter in the filtering region, to filter an optical signal. Through filtering by the slanted grating, a modulation chirp of the semiconductor laser is reduced, and an extinction ratio is increased.

At a modulation rate of 10 Gbps, a dispersion penalty requirement of a fiber transmission distance of 20 km can be met without requiring that bandwidth of the filtering region is half (5 GHz) of the modulation rate and an adiabatic chirp of the laser region is 5 GHz. Optionally, to achieve a small filtering loss, the adiabatic chirp of the laser region and the bandwidth of the filtering region may be from 1 GHz to 20 GHz. In this embodiment, filtering is implemented by using the slanted grating, to avoid a waveguide loss caused by the filtering region to the laser region.

The semiconductor laser provided in this embodiment may include the substrate and the layer body. The layer body includes the lower waveguide layer, the lower confining layer, the central layer, the upper confining layer, the grating layer, the upper waveguide layer, and the first electrode layer that are sequentially formed on the substrate in the preset direction. The preset direction is the direction from the end close to the substrate to the end away from the substrate. The layer body is divided into the laser region, the first isolation region, and the filtering region in the cavity length direction. The first isolation region is located between the laser region and the filtering region, and the first isolation region includes the groove formed by etching the first electrode layer. The first electrode layer in the laser region is configured to receive the first electrical excitation signal. The upper confining layer, the central layer, and the lower confining layer in the laser region form the active layer of the laser region, to generate and transmit an optical signal under the action of the first electrical excitation signal. The upper confining layer, the central layer, and the lower confining layer in the filtering region form the core layer of the filtering region, to transmit a filtered optical signal. The grating layer in the laser region includes the Bragg grating. The grating layer in the filtering region includes the slanted grating. The Bragg grating is configured to select the single longitudinal mode, and the slanted grating is configured to perform optical filtering. In the semiconductor laser provided in this embodiment, the single longitudinal mode may be selected by using the Bragg grating included in the grating layer in the laser region, and optical filtering may be performed by using the slanted grating included in the grating layer in the filtering region. In this way, a modulation chirp of the semiconductor laser is reduced, an extinction ratio is increased, dispersion of an optical pulse is reduced, and a transmission distance of an optical signal is increased, and therefore a requirement of an optical fiber transmission distance is met at a relatively low dispersion penalty.

In addition, in the semiconductor laser provided in this embodiment, there is no additional device manufacturing difficulty and costs when the modulation chirp is reduced through filtering by the slanted grating. Furthermore, a high single-mode yield can be achieved and high-power operation can be implemented simultaneously in a conventional encapsulation manner without using a standard device. The semiconductor laser may be applied to a PON system that imposes a high requirement on an optical power budget.

Optionally, in the semiconductor laser, a length of the laser region in the cavity length direction may be 200 micrometers (μm), a length of the first isolation region in the cavity length direction may be 20 μm, and a length of the filtering region in the cavity length direction may be 150 μm.

Optionally, in the semiconductor laser, a material structure of each laminated layer in the laser region is the same as a material structure of a corresponding laminated layer in the filtering region.

For example, the upper waveguide layer 12 and the lower waveguide layer 17 are configured to form a transmission waveguide of an optical signal, and may be made of an indium phosphide (InP) material. A thickness of each of the upper waveguide layer 12 and the lower waveguide layer 17 in the preset direction may be any thickness from 1.5 μm to 2 μm. A doping concentration of indium phosphide may be greater than or equal to $1E18$ $cm^{-3}$. A material structure of the upper waveguide layer 12 in the laser region is the same as a material structure of the upper waveguide layer 12 in the filtering region, and both may be made of an indium phosphide material. A doping concentration of the indium phosphide material may be any concentration value greater than or equal to $1E18$ $cm^{-3}$. A material structure of the lower waveguide layer 17 in the laser region is the same as a material structure of the lower waveguide layer 17 in the filtering region, and both may be made of an indium phosphide material. A doping concentration of the indium phosphide material may be any concentration value greater than or equal to $1E18$ $cm^{-3}$.

It should be noted that a thickness of the upper waveguide layer 12 in the laser region may be the same as or different from a thickness of the upper waveguide layer 12 in the filtering region. A thickness of the lower waveguide layer 17 in the laser region may be the same as or different from a thickness of the upper waveguide layer 17 in the filtering region.

The thickness of the upper waveguide layer 12 in the laser region may be the same as or different from the thickness of the lower waveguide layer 17 in the laser region. The thickness of the upper waveguide layer 12 in the filtering region may be the same as or different from the thickness of the lower waveguide layer 17 in the filtering region.

A material structure of the grating layer 13 in the laser region is the same as a material structure of the grating layer 13 in the filtering region, that is, a material structure of the Bragg grating is the same as a material structure of the slanted grating. For example, the material structures of each of the Bragg grating and the slanted grating may be alternating materials of indium phosphide and indium gallium arsenide phosphide (InGaAsP).

The upper confining layer 14 and the lower confining layer 16 are configured to limit carriers and photons in the preset direction and the opposite direction of the preset direction, and may be a graded index separate confinement heterostructure (GRIN-SCH) made of a quaternary material such as graded index (GRIN) indium gallium aluminum arsenide (InGaAlAs) that is unintentionally doped. A thickness of each of the upper confining layer 14 and the lower confining layer 16 in the preset direction may be any thickness from 50 nanometers (nm) to 100 nm. A material structure of the upper confining layer 14 in the laser region may be the same as a material structure of the upper confining layer 14 in the filtering region, and both may be a graded index separate confinement heterostructure made of a quaternary material such as indium gallium aluminum arsenide that is unintentionally doped.

The central layer 15 is configured to convert electric energy into a photon, and the central layer 15 is made of a quaternary material such as indium gallium aluminum arsenide that is unintentionally doped. A thickness of the central layer 15 in the preset direction may be any thickness from 100 nm to 200 nm. Optionally, the central layer 15 may be a multiple quantum well layer, a quantum wire layer, a quantum dot layer, or a core layer that is made of a semiconductor material. A material structure of the central layer 15 in the laser region may be the same as a material structure of the central layer 15 in the filtering region, and both may be made of a quaternary material such as indium gallium aluminum arsenide that is unintentionally doped.

In the semiconductor laser in this embodiment, the material structure of each laminated layer in the laser region is the same as the material structure of the corresponding laminated layer in the filtering region, to reduce manufacturing process difficulty of the semiconductor laser. In addition, the GRIN-SCH made of a quaternary material such as GRIN indium gallium aluminum arsenide (InGaAlAs) that is unintentionally doped is used as the upper confining layer 14 and the lower confining layer 16. In this way, a loss of the semiconductor laser can be effectively reduced.

Optionally, in the semiconductor laser, the substrate 18 may be made of any material of indium phosphide (InP), gallium arsenide (GaAs), or gallium nitride (GaN).

Figure 3:
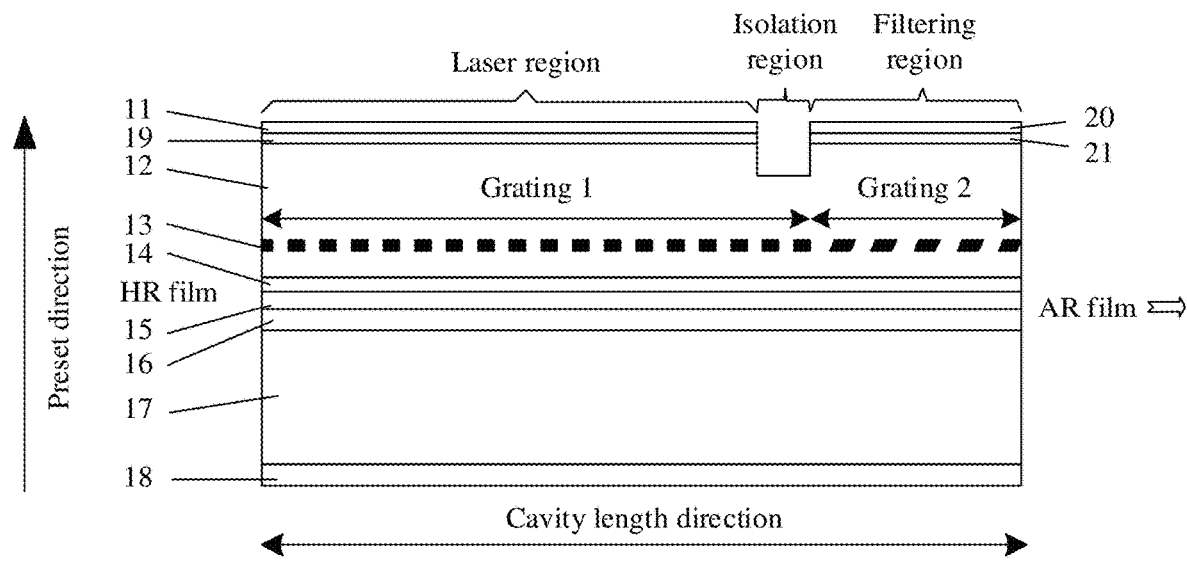
FIG. 3 is a second cross-sectional schematic view of a semiconductor laser in a cavity length direction according to an embodiment.

Optionally, on the basis of any one of the foregoing semiconductor lasers, an embodiment may further provide a semiconductor laser. FIG. 3 is a cross-sectional schematic view 2 of a semiconductor laser in a cavity length direction according to an embodiment. FIG. 3 is an example of a semiconductor laser with an active filtering region. As shown in FIG. 3, a contact layer 19 is further formed between the first electrode layer 11 and the upper waveguide layer 12. The groove in the first isolation region is formed by fully etching the first electrode layer 11 and the contact layer 19 and partially or fully etching the upper waveguide layer 12. An isolation resistance between the laser region and the filtering region is greater than or equal to 1000 ohms.

The contact layer 19 is configured to make an ohmic contact between the laser region and metal, and is usually made of heavily doped $In_{0.53}Ga_{0.47}As$. Doping concentration of $In_{0.53}Ga_{0.47}As$ may be greater than or equal to 1E19 $cm^{-3}$. A thickness of the contact layer 19 in a vertical direction may be any thickness from 50 nm to 300 nm.

The isolation region may also be referred to as an electrical isolation region, and is configured to isolate an electrical signal between the laser region and the filtering region. Fully etching the first electrode layer 11 and the contact layer 19 means fully etching the first electrode layer 11 and the contact layer 19 in the opposite direction of the preset direction.

Optionally, in some examples, the groove in the isolation region further includes an injected preset electric ion, to increase a resistance value of the isolation resistance.

For example, if the isolation resistance between the laser region and the filtering region cannot be greater than or equal to 1000 ohms after the groove is formed by fully etching the first electrode layer 11 and the contact layer 19 and partially etching the upper waveguide layer 12, the preset electric ion may be injected into the groove in the isolation region, to increase the resistance value of the isolation resistance.

Optionally, in the semiconductor laser shown in FIG. 3, in the layer body, a part corresponding to the filtering region further includes a contact layer 21 and a second electrode layer 20 that are sequentially formed on the upper waveguide layer in the preset direction, to amplify and filter an optical signal based on a received second electrical excitation signal.

The first electrode layer 11 may be a P-type electrode layer, and may be made of a titanium alloy, a platinum alloy, or metal. A thickness of the first electrode layer 11 in the preset direction may be any thickness from 500 nm to 2 μm.

The second electrode layer 20 may be an N-type electrode layer, and may be made of gold-germanium-nickel alloy or metal. A thickness of the second electrode layer 20 in the preset direction may be 200 nm to 500 nm.

It should be noted that in the semiconductor lasers shown in FIG. 2 and FIG. 3, the filtering region includes the second electrode layer that can receive the second electrical excitation signal. In this case, the filtering region may be an active region.

Optionally, in the semiconductor laser with the active filtering region, the active layer of the laser region is different from the core layer of the filtering region, and a photoluminescence wavelength of the core layer of the filtering region is at least 100 nm shorter than a photoluminescence wavelength of the active layer of the laser region.

In the semiconductor laser provided in this embodiment, a photocurrent may be injected into the contact layer in the filtering region, so that carrier density of the filtering region is greater than transparent carrier density. The photocurrent is continuously injected into the contact layer in the filtering region, to make a light output gain. In this way, light output efficiency of the semiconductor laser is improved while filtering is performed.

Figure 4:
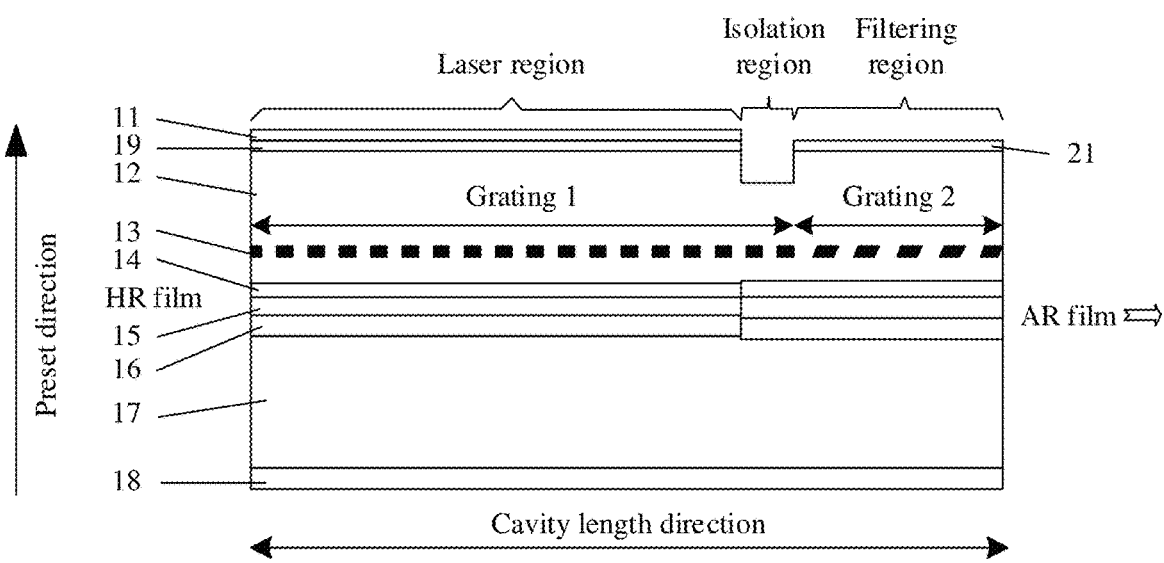
FIG. 4 is a third cross-sectional schematic view of a semiconductor laser in a cavity length direction according to an embodiment.

Optionally, on the basis of any one of the foregoing semiconductor lasers, an embodiment may further provide a semiconductor laser. FIG. 4 is a cross-sectional schematic view 3 of a semiconductor laser in a cavity length direction according to an embodiment. FIG. 4 is an example of a semiconductor laser with a passive filtering region. As shown in FIG. 4, in the semiconductor laser, in the layer body, a part corresponding to the filtering region further includes a contact layer 21 formed on the upper waveguide layer in the preset direction, but does not include the second electrode layer 20 in FIG. 3, to filter an optical signal.

The contact layer 21 is configured to make an ohmic contact between the filtering region and metal, and is usually made of heavily doped $In_{0.53}Ga_{0.47}As$. Doping concentration of $In_{0.53}Ga_{0.47}As$ may be greater than or equal to 1E19 $cm^{-3}$. A thickness of the contact layer 21 in a vertical direction may be any thickness from 50 nm to 300 nm.

In the semiconductor laser shown in FIG. 4, the upper waveguide layer 12 in the laser region and the upper waveguide layer 12 in the filtering region may differ in thickness in the preset direction, the upper confining layer 14 in the laser region and the upper confining layer 14 in the filtering region may differ in thickness in the preset direction, the central layer 15 in the laser region and the central layer 15 in the filtering region may differ in thickness in the preset direction, the lower confining layer 16 in the laser region and the lower confining layer 16 in the filtering region may differ in thickness in the preset direction, and the lower waveguide layer 17 in the laser region and the lower waveguide layer 17 in the filtering region may differ in thickness in the preset direction.

In the semiconductor laser with the passive filtering region, a bandgap wavelength of the central layer 15 in the filtering region is at least 150 nm less than a bandgap wavelength of the central layer 15 in the laser region, to reduce absorption of light by the upper waveguide layer 12 and the lower waveguide layer 17 in the filtering region. In this way, light output efficiency of the semiconductor laser is ensured.

Optionally, in the semiconductor laser shown in FIG. 3 or FIG. 4, a laser region-side end face is further plated with a highly reflective (HR) film. In the semiconductor laser shown in FIG. 3 or FIG. 4, a filtering region-side end face is plated with an antireflective (AR) film. The laser region-side end face may be an end face close to the laser region in the cavity length direction, and the filtering region-side end face may be an end face close to the filtering region in the cavity length direction.

The filtering region-side end face may be used as an output end of the semiconductor laser, to output an optical signal output by the semiconductor laser.

In this embodiment, in the semiconductor laser, the laser region-side end face is further plated with the HR film, and the filtering region-side end face is further plated with the AR film. In this way, light output efficiency of the semiconductor laser can be effectively improved.

Optionally, in the semiconductor laser, a central value of a lasing wavelength of the laser region falls within a range obtained by increasing or decreasing a frequency corresponding to a central value of a filtering wavelength of the filtering region by 50 GHz.

Optionally, in the semiconductor laser, the Bragg grating in the grating layer 13 is a phase-shifted grating. The phase-shifted grating is a phase-shifted grating with a wavelength of $\lambda/4$, where $\lambda$ is the lasing wavelength of the laser region.

A phase shift region of the phase-shifted grating with the wavelength of $\lambda/4$ may be located at a position, in the semiconductor laser, that is $\frac{1}{3}$ away from the laser region in the cavity length direction.

In this embodiment, the phase-shifted grating with the wavelength of λ/4 is used as the Bragg grating, so that a single-mode yield of the semiconductor laser can be achieved, and wavelength control on the optical signal output by the semiconductor laser can be simplified.

Optionally, a length of the Bragg grating in the cavity length direction is any length from 100 micrometers to 400 micrometers. For example, the length of the Bragg grating in the cavity length direction may be 220 μm.

In this embodiment, any length from 100 micrometers to 400 micrometers is used as the length of the Bragg grating in the semiconductor laser in the cavity length direction, so that a modulation rate of the semiconductor laser can be greater than or equal to 10 Gbps.

Optionally, the Bragg grating is any one of the following: a uniform refractive index-coupled grating, a gain-coupled grating, and a complex coupled grating. The gain-coupled grating is a grating including a periodically changing gain or loss medium. The complex coupled grating is a grating including the refractive index-coupled grating and the gain-coupled grating.

The laser region may be a gain and mode selection region in the semiconductor laser. The Bragg grating included in the grating layer 13 in the laser region may be configured to select a single longitudinal-mode optical signal, to implement lasing of a single longitudinal-mode signal, namely, a single-wavelength signal.

Optionally, in the semiconductor laser, the slanted grating may be a uniform grating with a preset slant angle.

A slant direction of the slanted grating is perpendicular to a waveguide direction or opposite to a waveguide direction, and the preset slant angle of the slanted grating may be a slant angle of the slanted grating in a direction perpendicular to the waveguide direction, or a slant angle of the slanted grating in an opposite direction of the waveguide direction. The waveguide direction may be an optical waveguide transmission direction of the upper waveguide layer 12 or the lower waveguide layer 17. The waveguide direction may be or may not be parallel to the cavity length direction.

Optionally, the preset slant angle of the slanted grating may be any angle from 2° to 10°.

In this embodiment, any angle from 2° to 10° is selected as the slant angle of the slanted grating, to reduce impact of reflected light of the slanted grating on the laser region.

Optionally, the Bragg grating in the grating layer 13, namely, the grating included in the grating layer 13 in the laser region, may satisfy the following formula (1):

$$2N_{\mathit{eff}1}\Lambda_1=\lambda_1 \quad \text{(formula (1)), where}$$

$N_{\mathit{eff}1}$ is an effective waveguide refractive index of the laser region, $\Lambda_1$ is a grating length of the Bragg grating in a single period, and $\lambda_1$ is a Bragg wavelength of the Bragg grating.

The effective waveguide refractive index of the laser region may be an effective refractive index of the upper waveguide layer 12 and the lower waveguide layer 17 in the laser region.

Optionally, the slanted grating in the grating layer 13, namely, the grating included in the grating layer 13 in the filtering region, may satisfy the following formula (2):

$$2N_{\mathit{eff}2}\Lambda_2=\lambda_2 \quad \text{(formula (2)), where}$$

$N_{\mathit{eff}2}$ is an effective waveguide refractive index of the filtering region, $\Lambda_2$ is a grating length of the slanted grating in a single period, and $\lambda_2$ is a filtering wavelength of the slanted grating.

The effective waveguide refractive index of the filtering region may be an effective refractive index of the upper waveguide layer 12 and the lower waveguide layer 17 in the filtering region.

Optionally, if the Bragg grating is the phase-shifted grating with a wavelength of λ/4, where λ is the lasing wavelength of the laser region, and $\lambda_2$ is equal to $\lambda_1$.

When the semiconductor laser has a relatively small extinction ratio, $\lambda_1$ may be a wavelength of a signal 0. There may be a deviation between specific values because of different currents of electrical excitation signals, that is, a difference between $\lambda_1$ and the wavelength of the signal 0 may fall within a preset range.

When the semiconductor laser is in a working state, working currents of the laser region and the filtering region may be adjusted to maximize a ratio of back-end optical power to front-end optical power of the semiconductor laser to implement alignment between $\lambda_2$ and $\lambda_1$, thereby implementing wavelength locking.

Optionally, a length of the slanted grating in the cavity length direction is 150 nanometers.

Optionally, a central value of the lasing wavelength of the laser region falls within a range obtained by increasing or decreasing a frequency corresponding to a central value of the filtering wavelength of the filtering region by 50 GHz.

Optionally, the laser region may be a DFB region or a DBR region. If the laser region is a DBR region, the laser region may be a two-segment DBR region, and the two-segment DBR region is sequentially divided into a rear reflection region and a gain region in the cavity length direction. Alternatively, the laser region may be a three-segment DBR region, and the three-segment DBR region is sequentially divided into a rear reflection region, a gain region, and a phase region in the cavity length direction. Alternatively, the laser region may be a four-segment DBR region, and the four-segment DBR region is sequentially divided into a rear reflection region, a gain region, a phase region, and a front reflection region in the cavity length direction.

No matter which DBR region is used, there is an isolation region, for example, a second isolation region, between two adjacent regions in the DBR region. The isolation region between the two adjacent regions may be formed by fully etching the first electrode layer 11 and partially or fully etching the upper waveguide layer 12 in the opposite direction of the preset direction. An isolation resistance between the adjacent regions is greater than 1000 ohms. Optionally, a contact layer 19 is further formed between the first electrode layer 11 and the upper waveguide layer 12. In this case, the isolation region between the two adjacent regions may be formed by fully etching the first electrode layer 11 and the contact layer 19 and partially or fully etching the upper waveguide layer 12 in the opposite direction of the preset direction.

In the laser region, the grating layer 13 in the rear reflection region and the front reflection region may include a Bragg grating.

The laser includes at least one of the rear reflection region and the front reflection region. For example, if the laser region is a two-segment DBR region or a three-segment DBR region, the laser needs to include the rear reflection region; or if the laser region is a four-segment DBR region, the laser region needs to include the rear reflection region and the front reflection region.

Optionally, photoluminescence wavelengths of active layers of the phase region and the reflection region are at least 100 nm shorter than a photoluminescence wavelength of an active layer of the gain region. The reflection region is the front reflection region or the rear reflection region.

Figure 5:
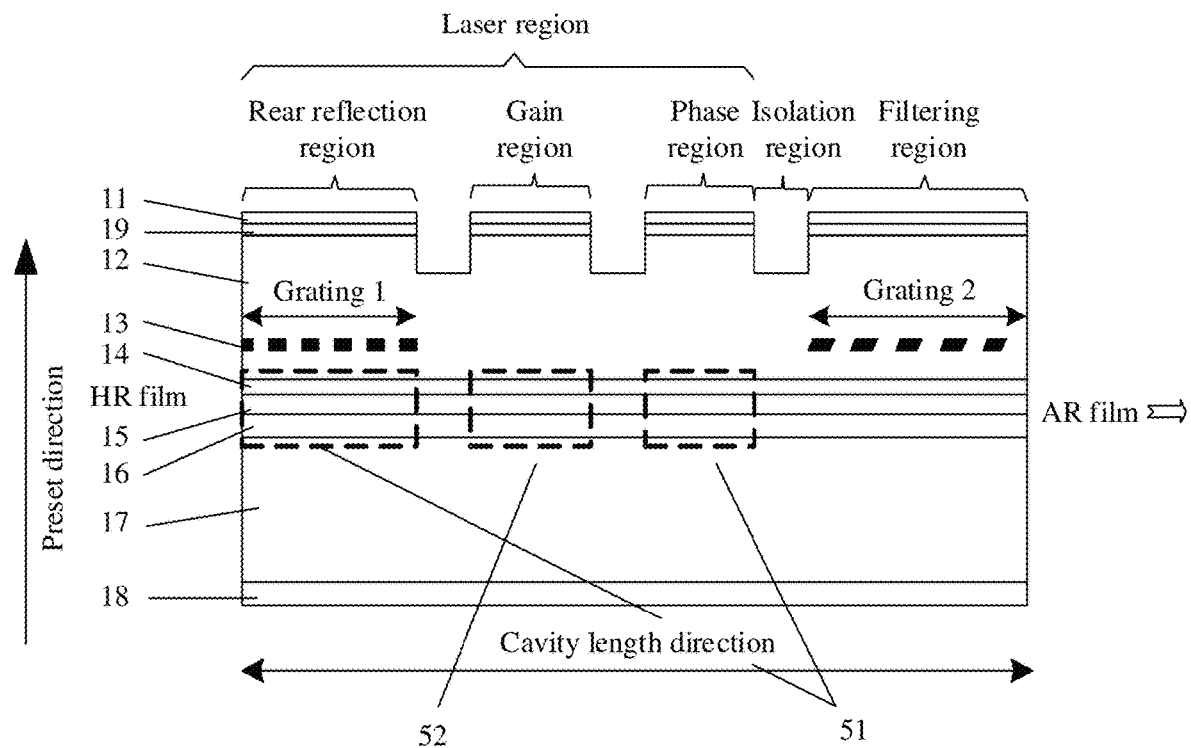
FIG. 5 is a fourth cross-sectional schematic view of a semiconductor laser in a cavity length direction according to an embodiment.

The following describes, by using an example in which the laser region is a three-segment DBR region, the semiconductor laser provided in the foregoing embodiment. FIG. 5 is a cross-sectional schematic view 4 of a semiconductor laser in a cavity length direction according to an embodiment. FIG. 5 is an example of a semiconductor laser whose laser region is a three-segment DBR region. As shown in FIG. 5, the semiconductor laser includes a substrate 18 and a layer body. The layer body includes a lower waveguide layer 17, a lower confining layer 16, a central layer 15, an upper confining layer 14, a grating layer 13, an upper waveguide layer 12, and a first electrode layer 11 that are sequentially formed on the substrate 18 in a preset direction. A contact layer 19 is further formed between the first electrode layer 11 and the upper waveguide layer 12.

The semiconductor laser is divided into a laser region, a first isolation region, and a filtering region in a cavity length direction. The laser region is divided into a rear reflection region, a gain region, and a phase region in the cavity length direction.

The first isolation region may include a groove formed by fully etching the first electrode layer 11 and the contact layer 19 and partially or fully etching the upper waveguide layer 12 in an opposite direction of the preset direction. The first isolation region may be configured to implement electrical isolation between the laser region and the filtering region.

In the laser region, there is a second isolation region between two adjacent regions such as the rear reflection region and the gain region or the gain region and the phase region. The second isolation region may include the groove formed by fully etching the first electrode layer 11 and the contact layer 19 and partially or fully etching the upper waveguide layer 12 in the opposite direction of the preset direction. The second isolation region may be configured to implement electrical isolation between the two adjacent regions in the laser region.

The laser region, the isolation region, and the filtering region are located on the substrate 18. The laser region is configured to: generate and transmit an optical signal. The filtering region may also be referred to as a filter region, and is configured to filter an optical signal.

The first electrode layer 11 in the laser region is configured to receive a first electrical excitation signal. The upper confining layer 14, the central layer 15, and the lower confining layer 16 in the laser region form an active layer of the laser region, to generate and transmit an optical signal under the action of the first electrical excitation signal. The upper confining layer 14, the central layer 15, and the lower confining layer 16 in the filtering region form a core layer of the filtering region, to transmit a filtered optical signal.

The upper confining layer 14, the central layer 15, and the lower confining layer 16 in the rear reflection region in the laser region form a core layer 51 of the rear reflection region in the laser region. The upper confining layer 14, the central layer 15, and the lower confining layer 16 in the phase region in the laser region form a core layer 51 of the phase region in the laser region. The upper confining layer 14, the central layer 15, and the lower confining layer 16 in the gain region in the laser region form an active layer 52 of the gain region in the laser region.

Bandgap wavelengths, also referred to as photoluminescence wavelengths, of the core layers 51 of the rear reflection region and the phase region may be at least 100 nm shorter than a bandgap wavelength of the active layer 52 of the gain region.

The grating layer 13 in the rear reflection region in the laser region includes a Bragg grating. The Bragg grating in the rear reflection region in the laser region may form a grating 1 shown in FIG. 5. The grating layer 13 in the filtering region includes a slanted grating, for example, a grating 2 shown in FIG. 5. The Bragg grating is configured to select a single longitudinal mode, and the slanted grating is configured to perform optical filtering.

For description of the Bragg grating and the slanted grating shown in FIG. 5, refer to the foregoing description. Details are not described herein again.

In the semiconductor laser, a laser region-side end face is further plated with an HR film, and a filtering region-side end face is further plated with an AR film, to effectively improve light output efficiency of the semiconductor laser.

In the semiconductor laser provided in this embodiment, the single longitudinal mode may be selected by using the Bragg grating included in the grating layer in the laser region, and optical filtering may be performed by using the slanted grating included in the grating layer in the filtering region. In this way, a modulation chirp of the semiconductor laser is reduced, an extinction ratio is increased, dispersion of an optical pulse is reduced, and a transmission distance of an optical signal is increased, and therefore a requirement of an optical fiber transmission distance is met at a relatively low dispersion penalty.

In addition, in the semiconductor laser in this embodiment, there is no additional device manufacturing difficulty and costs when the modulation chirp is reduced through filtering by the slanted grating. Furthermore, a high single-mode yield can be achieved and high-power operation can be implemented in a conventional encapsulation manner without using a standard device. The semiconductor laser may be applied to a PON system that imposes a high requirement on an optical power budget.

Figure 6:
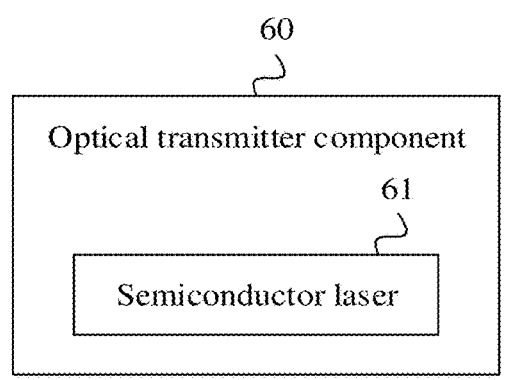
FIG. 6 is a schematic structural diagram of an optical transmitter component according to an embodiment.

Optionally, an embodiment may further provide an optical transmitter component. FIG. 6 is a schematic structural diagram of an optical transmitter component according to an embodiment. As shown in FIG. 6, the optical transmitter component 60 may include a semiconductor laser 61. The semiconductor laser 61 may be the semiconductor laser shown in any one of FIG. 2 to FIG. 5.

The transmitter component includes the semiconductor laser shown in any one of FIG. 2 to FIG. 5, and therefore a single longitudinal mode may be selected by using a Bragg grating included in a grating layer in a laser region, and optical filtering may be performed by using a slanted grating included in the grating layer in a filtering region. In this way, a modulation chirp of the transmitter component is reduced, an extinction ratio is increased, dispersion of an optical pulse is reduced, and a transmission distance of an optical signal is increased, and therefore a requirement of an optical fiber transmission distance is met at a relatively low dispersion penalty.

Figure 7:
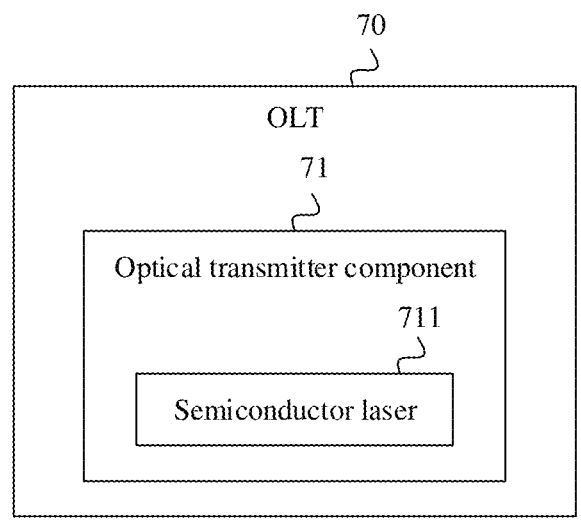
FIG. 7 is a schematic structural diagram of an OLT according to an embodiment.

Optionally, an embodiment may further provide an OLT. FIG. 7 is a schematic structural diagram of an OLT according to an embodiment. As shown in FIG. 7, the OLT 70 may include an optical transmitter component 71. The optical transmitter component 71 includes a semiconductor laser 711. The semiconductor laser 711 may be the semiconductor laser shown in any one of FIG. 2 to FIG. 5.

The optical transmitter component in the OLT may include the semiconductor laser shown in any one of FIG. 2 to FIG. 5, and therefore a single longitudinal mode may be selected by using a Bragg grating included in a grating layer in a laser region, and optical filtering may be performed by using a slanted grating included in the grating layer in a filtering region. In this way, a modulation chirp of the OLT is reduced, an extinction ratio is increased, dispersion of an optical pulse is reduced, and a transmission distance of an optical signal is increased, and therefore a requirement of an optical fiber transmission distance is met at a relatively low dispersion penalty.

Figure 8:
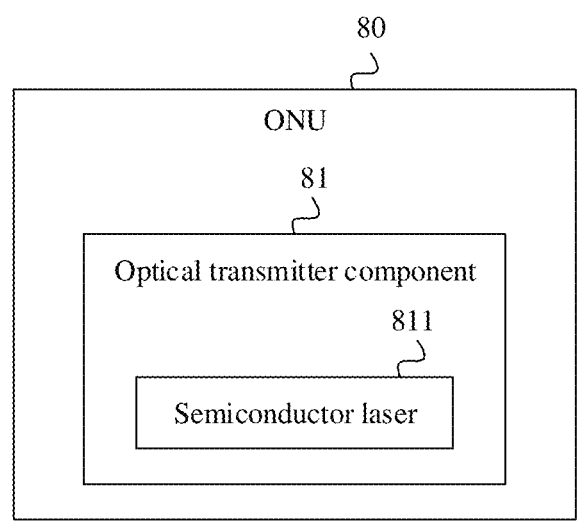
FIG. 8 is a schematic structural diagram of an ONU according to an embodiment.

Optionally, an embodiment may further provide an ONU. FIG. 8 is a schematic structural diagram of an ONU according to an embodiment. As shown in FIG. 8, the ONU 80 may include an optical transmitter component 81. The optical transmitter component includes a semiconductor laser 811. The semiconductor laser 811 may be the semiconductor laser shown in any one of FIG. 2 to FIG. 5.

The optical transmitter component in the ONU may include the semiconductor laser shown in any one of FIG. 2 to FIG. 5, and therefore a single longitudinal mode may be selected by using a Bragg grating included in a grating layer in a laser region, and optical filtering may be performed by using a slanted grating included in the grating layer in a filtering region. In this way, a modulation chirp of the ONU is reduced, an extinction ratio is increased, dispersion of an optical pulse is reduced, and a transmission distance of an optical signal is increased, and therefore a requirement of an optical fiber transmission distance is met at a relatively low dispersion penalty.

The foregoing descriptions are merely implementations of the embodiments, but are non-limiting.

What is claimed is:

1. A semiconductor laser, comprising a substrate and a layer body, wherein the layer body comprises:
    a lower waveguide layer,
    a lower confining layer,
    a central layer made of indium gallium aluminum arsenide, wherein a thickness of the central layer in a preset direction is in a range between 100 nm and 200 nm and the preset direction is a direction from an end close to the substrate to an end away from the substrate,
    an upper confining layer, wherein the upper confining layer and the lower confining layer are configured to limit carriers and photons,
    a grating layer,
    an upper waveguide layer, and
    a first electrode layer that are sequentially formed on the substrate in the preset direction, the layer body is divided into:
    a laser region,
    a first isolation region, and
    a filtering region in a cavity length direction, wherein the first isolation region is located between the laser region and the filtering region, the first isolation region comprises a groove formed by etching the first electrode layer, the first electrode layer in the laser region is configured to receive a first electrical excitation signal, the upper confining layer, the central layer, and the lower confining layer in the laser region form an active layer of the laser region, to generate and transmit an optical signal under an action of the first electrical excitation signal, the upper confining layer, the central layer, and the lower confining layer in the filtering region form a core layer of the filtering region, to transmit a filtered optical signal, the grating layer in the laser region comprises:
    a Bragg grating configured to select a single longitudinal mode, wherein the Bragg grating is a complex coupled grating comprising both a refractive index-coupled grating and a gain-coupled grating, and the grating layer in the filtering region comprises a slanted grating configured to perform optical filtering.

2. The semiconductor laser according to claim 1, wherein a material structure of each laminated layer of the laser region is the same as a material structure of a corresponding laminated layer of the filtering region.

3. The semiconductor laser according to claim 2, wherein a length of the Bragg grating in the cavity length direction is in a range between 100 micrometers and 400 micrometers.

4. The semiconductor laser according to claim 1, wherein the Bragg grating is a phase-shifted grating with a wavelength of λ/4, wherein λ is a lasing wavelength of the laser region.

5. The semiconductor laser according to claim 1, wherein the gain-coupled grating is a grating comprising a periodically changing gain or loss medium.

6. The semiconductor laser according to claim 1, wherein the slanted grating is a uniform grating with a preset slant angle, and the slanted grating is perpendicular to a waveguide direction or opposite to a waveguide direction.

7. The semiconductor laser according to claim 6, wherein the preset slant angle is any angle from 2° to 10°.

8. The semiconductor laser according to claim 1, wherein the Bragg grating satisfies the following formula (1):

$$2N_{\mathit{eff}1}\Lambda_1=\lambda_1 \qquad \text{(formula (1))}$$

wherein $N_{\mathit{eff}1}$ is an effective waveguide refractive index of the laser region; $\Lambda_1$ is a grating length of the Bragg grating in a single period; $\lambda_1$ is a Bragg wavelength of the Bragg grating.

9. The semiconductor laser according to claim 8, wherein the slanted grating satisfies the following formula (2):

$$2N_{\mathit{eff}2}\Lambda_2=\lambda_2 \qquad \text{(formula (2))}$$

wherein $N_{\mathit{eff}2}$ is an effective waveguide refractive index of the filtering region; $\Lambda_2$ is a grating length of the slanted grating in a single period; $\lambda_2$ is a filtering wavelength of the slanted grating.

10. The semiconductor laser according to claim 9, wherein if the Bragg grating is the phase-shifted grating with the wavelength of λ/4, wherein λ is the lasing wavelength of the laser region, and $\lambda_2$ is equal to $\lambda_1$.

11. The semiconductor laser according to claim 1, wherein a length of the slanted grating in the cavity length direction is 150 nanometers.

12. The semiconductor laser according to claim 1, wherein in the semiconductor laser, a laser region-side end face is plated with a highly reflective (HR) film; and in the semiconductor laser, a filtering region-side end face is plated with an antireflective (AR) film.

13. The semiconductor laser according to claim 1, wherein a central value of the lasing wavelength of the laser region falls within a range obtained by increasing or decreasing a frequency corresponding to a central value of the filtering wavelength of the filtering region by 50 GHz.

14. The semiconductor laser according to claim 1, wherein a contact layer is further formed between the first electrode layer and the upper waveguide layer, the groove is formed by fully etching the first electrode layer and the contact layer and partially or fully etching the upper waveguide layer, and an isolation resistance of the first isolation region located between the laser region and the filtering region is greater than 1000 ohms.

15. The semiconductor laser according to claim 1, wherein the active layer of the laser region is different from the core layer of the filtering region, and a photoluminescence wavelength of the core layer of the filtering region is at least 100 nanometers shorter than a photoluminescence wavelength of the active layer of the laser region.

16. The semiconductor laser according to claim 1, wherein in the layer body, a part corresponding to the filtering region further comprises a contact layer and a second electrode layer that are sequentially formed on the upper waveguide layer in the preset direction, to amplify and filter an optical signal based on a received second electrical excitation signal; or in the layer body, a part corresponding to the filtering region further comprises a contact layer that is formed on the upper waveguide layer in the preset direction, but does not comprise a second electrode layer, to filter an optical signal.

17. The semiconductor laser according to claim 1, wherein the central layer is a core layer, a multiple quantum well layer, a quantum line layer, or a quantum dot layer that is made of a semiconductor material.

18. An optical line terminal (OLT), comprising: an optical transmitter component, wherein the optical transmitter component comprises a semiconductor laser comprising: a substrate and a layer body comprising:
- a lower waveguide layer,
- a lower confining layer,
- a central layer made of indium gallium aluminum arsenide, wherein a thickness of the central layer in a preset direction is in a range between 100 nm and 200 nm, and the preset direction is a direction from an end close to the substrate to an end away from the substrate
- an upper confining layer, wherein the upper confining layer and the lower confining layer are configured to limit carriers and photons,
- a grating layer,
- an upper waveguide layer, and
- a first electrode layer that are sequentially formed on the substrate in the preset direction, wherein the layer body is divided into:
- a laser region,
- a first isolation region, and
- a filtering region in a cavity length direction, the first isolation region is located between the laser region and the filtering region, the first isolation region comprises a groove formed by etching the first electrode layer, the first electrode layer in the laser region is configured to receive a first electrical excitation signal, the upper confining layer, the central layer, and the lower confining layer in the laser region form an active layer of the laser region, to generate and transmit an optical signal under an action of the first electrical excitation signal, the upper confining layer, the central layer, and the lower confining layer in the filtering region form a core layer of the filtering region, to transmit a filtered optical signal, the grating layer in the laser region comprises:
- a Bragg grating configured to select a single longitudinal mode, wherein the Bragg grating is a complex coupled grating comprising both a refractive index-coupled grating and a gain-coupled grating, and the grating layer in the filtering region comprises a slanted grating configured to perform optical filtering.

19. An optical network unit (ONU), comprising an optical transmitter component, wherein the optical transmitter component comprises a semiconductor laser comprising a substrate and a layer body comprising:
- a lower waveguide layer,
- a lower confining layer,
- a central layer made of indium gallium aluminum arsenide, wherein a thickness of the central layer in a preset direction is in a range between 100 nm and 200 nm, and the preset direction is a direction from an end close to the substrate to an end away from the substrate,
- an upper confining layer, wherein the upper confining layer and the lower confining layer are configured to limit carriers and photons,
- a grating layer,
- an upper waveguide layer, and
- a first electrode layer that are sequentially formed on the substrate in the preset direction, wherein the layer body is divided into:
- a laser region,
- a first isolation region, and
- a filtering region in a cavity length direction, the first isolation region is located between the laser region and the filtering region, the first isolation region comprises a groove formed by etching the first electrode layer, the first electrode layer in the laser region is configured to receive a first electrical excitation signal, the upper confining layer, the central layer, and the lower confining layer in the laser region form an active layer of the laser region, to generate and transmit an optical signal under an action of the first electrical excitation signal, the upper confining layer, the central layer, and the lower confining layer in the filtering region form a core layer of the filtering region, to transmit a filtered optical signal, the grating layer in the laser region comprises:
- a Bragg grating configured to select a single longitudinal mode, wherein the Bragg grating is a complex coupled grating comprising both a refractive index-coupled grating and a gain-coupled grating, and the grating layer in the filtering region comprises a slanted grating configured to perform optical filtering.

* * * * *